US012035112B2

(12) United States Patent
Huang et al.

(10) Patent No.: US 12,035,112 B2
(45) Date of Patent: Jul. 9, 2024

(54) EARPHONE EAR-ORIENTED DEBUGGING METHOD, APPARATUS AND SYSTEM, AND WIRELESS EARPHONE

(71) Applicant: ZHUHAI JIELI TECHNOLOGY CO., LTD, Zhuhai (CN)

(72) Inventors: Haitao Huang, Zhuhai (CN); Yihui Wang, Zhuhai (CN); Zhihuan Deng, Zhuhai (CN)

(73) Assignee: ZHUHAI JIELI TECHNOLOGY CO., LTD, Zhuhai (CN)

( * ) Notice: Subject to any disclaimer, the term of this patent is extended or adjusted under 35 U.S.C. 154(b) by 160 days.

(21) Appl. No.: 17/773,177

(22) PCT Filed: Sep. 30, 2020

(86) PCT No.: PCT/CN2020/119606
§ 371 (c)(1),
(2) Date: Apr. 29, 2022

(87) PCT Pub. No.: WO2021/082874
PCT Pub. Date: May 6, 2021

(65) Prior Publication Data
US 2022/0377478 A1 Nov. 24, 2022

(30) Foreign Application Priority Data
Oct. 29, 2019 (CN) ......................... 201911036889.8

(51) Int. Cl.
*H04R 29/00* (2006.01)
*H04R 1/10* (2006.01)

(52) U.S. Cl.
CPC ........... *H04R 29/00* (2013.01); *H04R 1/1041* (2013.01); *H04R 2420/07* (2013.01)

(58) Field of Classification Search
CPC .............................. H04R 29/00; H04R 1/1041
See application file for complete search history.

(56) References Cited

U.S. PATENT DOCUMENTS

2003/0026438 A1 2/2003 Ray et al.
2005/0273791 A1 12/2005 Evans et al.
(Continued)

FOREIGN PATENT DOCUMENTS

CN 104984490 10/2015
CN 107155161 9/2017
(Continued)

OTHER PUBLICATIONS

International Search Report for corresponding Application No. PCT/CN2020/119606 dated Dec. 30, 2020, 4 pages.
(Continued)

*Primary Examiner* — Simon King
(74) *Attorney, Agent, or Firm* — Taft Stettinius & Hollister LLP

(57) ABSTRACT

Disclosed are an earphone ear-oriented debugging method, apparatus and system, and a wireless earphone. The method comprises: confirming an in-ear state signal indicating that a first earphone and a second earphone are in an in-ear state; sending a plurality of first ear-oriented debugging waves to the second earphone according to the in-ear state signal, wherein the plurality of first ear-oriented debugging waves respectively correspond to a plurality of frequency points for wireless communication in a one-to-one correspondence; receiving a first earphone configuration instruction sent from the second earphone, wherein the first earphone configuration instruction is generated by the second earphone according to the first ear-oriented debugging waves; and configuring a configuration parameter of an antenna matching element of the first earphone according to the first earphone configuration instruction, to optimize a communication state.

20 Claims, 5 Drawing Sheets

(56) References Cited

U.S. PATENT DOCUMENTS

| | | | | |
|---|---|---|---|---|
| 2014/0126735 | A1 | 5/2014 | Gauger, Jr. | |
| 2018/0159639 | A1* | 6/2018 | Ning | H04B 17/21 |
| 2021/0391644 | A1* | 12/2021 | Kawamura | H01Q 1/36 |

FOREIGN PATENT DOCUMENTS

| | | | |
|---|---|---|---|
| CN | 107707282 | | 2/2018 |
| CN | 207070308 | | 3/2018 |
| CN | 207184759 | | 4/2018 |
| CN | 108401217 | | 8/2018 |
| CN | 108989937 | A | 12/2018 |
| CN | 109076279 | | 12/2018 |
| CN | 109151212 | A | 1/2019 |
| CN | 109167155 | | 1/2019 |
| CN | 109561419 | | 4/2019 |
| CN | 110166922 | | 8/2019 |
| CN | 110278506 | A | 9/2019 |
| CN | 110312237 | | 10/2019 |
| CN | 110351696 | A | 10/2019 |
| CN | 111436016 | A | 7/2020 |
| WO | 2014070992 | A1 | 5/2014 |

OTHER PUBLICATIONS

Written Opinion for corresponding Application No. PCT/CN2020/119606 dated Dec. 30, 2020, 6 pages.

Chinese Office Action for corresponding Application No. 201911036889.8 dated Jan. 27, 2021, 9 pages.

Supplementary Search for Application No. 2019110368898 dated May 25, 2021, 1 page.

* cited by examiner

EARPHONE EAR-ORIENTED DEBUGGING METHOD, APPARATUS AND SYSTEM, AND WIRELESS EARPHONE

CROSS REFERENCE TO RELATED APPLICATIONS

This is a U.S. National Stage application of, and claims priority to, PCT/CN2020/119606, filed Sep. 30, 2020, which further claims priority to Chinese Patent Application No. 201911036889.8, filed Oct. 29, 2019, the disclosures of which are incorporated herein by reference in their entirety.

TECHNICAL FIELD

The present disclosure relates to a wireless earphone technology, in particular to an earphone ear-oriented debugging method, apparatus, system and a wireless earphone.

BACKGROUND

With the development of mobile communication and the advancement of wireless audio transmission, the demand for earphones in the market is increasing, and the user's demand for earphones for audio data transmission is also getting higher and higher. At present, in the earphone market, there still exists wired earphones and wireless earphones. The wired earphones are traditional earphone products. Compared with the emerging wireless earphones, especially Bluetooth earphones, the wired earphones are gradually declining. Among them, Bluetooth earphones are growing explosively, and there are many solutions for Bluetooth earphones in the market. Therefore, among numerous products, users have higher and higher requirements for the experience of using Bluetooth earphones, and how to improve performances of the Bluetooth earphones in all aspects has been a research direction by various manufacturers.

SUMMARY

In the earphone ear-oriented debugging method in the embodiments of the present disclosure, after that a first earphone and a second earphone enter the in-ear state is confirmed, a plurality of first ear-oriented debugging waves are sent to the second earphone, and the plurality of first ear-oriented debugging waves respectively correspond to the plurality of frequency points for wireless communication in a one-to-one correspondence. And, the first earphone configuration instruction sent from the second earphone is received. Since the first earphone configuration instruction at this time is generated after the first earphone and the second earphone enter the in-ear state, the first earphone configuration instruction can be better adapted to the current actual usage environment. As a result, the configuration of the configuration parameter of the antenna matching element of the first earphone according to the first earphone configuration instruction can be better adapted to the current actual usage environment, thereby reducing an ear-oriented debugging error that is caused by a usage environment difference, and optimizing communication quality.

In an embodiment, the confirming the in-ear state signal indicating that the first earphone and the second earphone are in the in-ear state includes: obtaining an in-ear triggering signal indicating the first earphone and the second earphone entering the in-ear state; judging whether the first earphone and the second earphone are maintained in the in-ear state in a preset duration; and confirming the in-ear state signal responsive to the first earphone and the second earphone being maintained in the in-ear state in the preset duration.

In an embodiment, after configuring the configuration parameter of the antenna matching element of the first earphone according to the first earphone configuration instruction, the method further includes: updating a plurality of current first ear-oriented debugging waves, and sending the plurality of current first ear-oriented debugging waves to the second earphone; receiving an updated first earphone configuration instruction sent from the second earphone; and configuring a configuration parameter of the antenna matching element of the first earphone according to the updated first earphone configuration instruction, to optimize the communication state.

In an embodiment, after configuring the configuration parameter of the antenna matching element of the first earphone according to the updated first earphone configuration instruction, the method further includes: receiving a confirmation message confirming an optimal communication state from the second earphone; determining a current configuration parameter of the antenna matching element of the first earphone based on the confirmation message.

According to a second aspect, some embodiments of the present disclosure provide an earphone ear-oriented debugging method, including:

after entering an in-ear state, receiving a plurality of first ear-oriented debugging waves sent from the first earphone, wherein the plurality of first ear-oriented debugging waves respectively correspond to a plurality of frequency points for wireless communication in a one-to-one correspondence; generating a first earphone configuration instruction based on the plurality of first ear-oriented debugging waves, wherein the first earphone configuration instruction is configured to configure a configuration parameter of an antenna matching element of the first earphone, to optimize a communication state; and sending the first earphone configuration instruction to the first earphone.

In an embodiment, the generating the first earphone configuration instruction based on the plurality of first ear-oriented debugging waves includes: obtaining a first sensibility-frequency point mapping relation based on the plurality of first ear-oriented debugging waves and a preset algorithm; judging whether a frequency point corresponding to an optimal first sensibility is within a preset frequency point range; and generating the first earphone configuration instruction responsive to the frequency point corresponding to the optimal first sensibility being not within the preset frequency point range, to configure the configuration parameter of the antenna matching element of the first earphone, to cause the frequency point corresponding to the optimal first sensibility to shift in a direction close to the preset frequency point range.

In an embodiment, after the sending the first earphone configuration instruction to the first earphone, the method further includes: receiving a plurality of updated first ear-oriented debugging waves sent from the first earphone; obtaining an updated first sensibility-frequency point mapping relation based on the plurality of updated first ear-oriented debugging waves; judging whether a frequency point corresponding to an updated optimal first sensibility is within a preset frequency point range; updating and sending the first earphone configuration instruction to the first earphone responsive to a frequency point corresponding to the updated optimal first sensibility being not within the preset frequency point range, to configure a configuration parameter of the antenna matching element of the first earphone, to cause the frequency point corresponding to the optimal first sensibility to shift in a direction close to the preset frequency point range.

In an embodiment, responsive to the updated optimal first sensibility being within the preset frequency point range, sending a confirmation message confirming an optimal state to the first earphone. In an embodiment, a high-frequency band signal of the speech signal is obtained, the high-frequency band signal and the noise-reduced low-frequency band signal are synthesized to obtained the noise-reduced speech signal. Alternately, a high-frequency band signal of the speech signal is obtained, then the high-frequency band signal is noise-reduced, after that, the noise-reduced high-frequency band signal and the noise-reduced high-frequency band signal are synthesized to obtain the noise-reduced speech signal. It shall be noted that the noise-reduced processing method for the high-frequency band signal may be any method in the related art, which is not specifically limited herein. The signal synthesis may be performed in a manner used in the related art.

According to a third aspect, some embodiments of the present disclosure provide an earphone ear-oriented debugging method, including:

any earphone ear-oriented debugging method in the above first aspect; after the configuring the configuration parameter of the antenna matching element of the first earphone according to the first earphone configuration instruction, further including: receiving a plurality second ear-oriented debugging waves sent from the second earphone, wherein the plurality of second ear-oriented debugging waves respectively correspond to a plurality of frequency points for wireless communication in a one-to-one correspondence; generating a second earphone configuration instruction based on the plurality of second ear-oriented debugging waves, wherein the second earphone configuration instruction is configured to configure a configuration parameter of an antenna matching element of the second earphone, to optimize a communication state; sending the second earphone configuration instruction to the second earphone.

In an embodiment, the generating the second earphone configuration instruction based on the plurality of second ear-oriented debugging waves includes: obtaining a second sensibility- frequency point mapping relation based on the plurality of second ear-oriented debugging waves and a preset algorithm; judging whether a frequency point corresponding to an optimal second sensibility is within a preset frequency point range; generating the second earphone configuration instruction responsive to the frequency point corresponding to the optimal second sensibility being not within the preset frequency point range, to configure a configuration parameter of the antenna matching element of the second earphone, to cause the frequency point corresponding to the optimal second sensibility to shift in a direction close to the preset frequency point range.

In an embodiment, after the sending the second earphone configuration instruction to the second earphone, the method further includes: receiving a plurality of updated second ear-oriented debugging waves sent from the second earphone; obtaining an updated second sensibility-frequency point mapping relation based on the plurality of updated second ear-oriented debugging waves; judging whether a frequency point corresponding to the updated optimal second sensibility is within a preset frequency point range; responsive to the frequency point corresponding to the updated optimal second sensibility being not within the preset frequency point range, updating the second earphone configuration instruction, to configure the configuration parameter of the antenna matching element of the second earphone, to cause the frequency point corresponding to the optimal second sensibility to shift in a direction close to the preset frequency point range.

In an embodiment, responsive to the updated optimal second sensibility being within the preset frequency point range, sending a confirmation message confirming an optimal state to the second earphone.

According to a fourth aspect, some embodiments of the present disclosure provide an earphone ear-oriented debugging method, including: any earphone ear-oriented debugging method in the above second aspect; after confirming the first earphone configuration is completed, further includes: sending a plurality second ear-oriented debugging waves to the first earphone, wherein the plurality second ear-oriented debugging waves respectively correspond to a plurality of frequency points for wireless communication in a one-to-one correspondence; receiving a second earphone configuration instruction sent from the first earphone, wherein the second earphone configuration instruction is generated by the first earphone based on the second ear-oriented debugging waves; and configuring a configuration parameter of an antenna matching element of the second earphone according to the second earphone configuration instruction, to optimize a communication state.

In an embodiment, after configuring the configuration parameter of the antenna matching element of the second earphone according to the second earphone configuration instruction, the method further includes: updating and sending a plurality of current second ear-oriented debugging waves to the first earphone; receiving an updated second earphone configuration instruction sent from the first earphone; configuring a configuration parameter of the antenna matching element of the second earphone according to the updated second earphone configuration instruction, to optimize a communication state.

In an embodiment, after configuring the configuration parameter of the antenna matching element of the second earphone according to the updated second earphone configuration instruction, the method further includes: receiving a confirmation message confirming an optimal communication state from the first earphone; determining a current configuration parameter of the antenna matching element of the second earphone based on the confirmation message.

According to a fifth aspect, some embodiments of the present disclosure provide an earphone ear-oriented debugging method, including:

any earphone ear-oriented debugging method in the above first aspect; or, any earphone ear-oriented debugging method in the above second aspect; before sending the plurality of first ear-oriented debugging waves to the second earphone based on the in-ear state signal, further including: initializing configuration of the antenna matching element of the first earphone, to optimize a communication state.

In an embodiment, the initializing configuration of the antenna matching element of the first earphone includes: sending a plurality of first initial debugging waves to the second earphone based on an initial turn-on signal; receiving a first initial configuration instruction sent from the second earphone, wherein the first initial configuration instruction is generated by the second earphone according to the first initial debugging wave; and initializing configuration of a configuration parameter of an antenna matching element of the first earphone according to the first initial configuration instruction, to optimize a communication state.

In an embodiment, after initializing configuration of the antenna matching element of the first earphone according to the first initial configuration instruction, the method further includes: receiving a plurality of second initial debugging waves sent from the second earphone; generating an initial configuration instruction of the second earphone based on the plurality of second initial debugging waves; sending the initial configuration instruction of the second earphone to the second earphone, to initialize configuration of an antenna matching element of the second earphone, to optimize the communication state.

According to a sixth aspect, some embodiments of the present disclosure provide an earphone ear-oriented debugging method, including:

any earphone ear-oriented debugging method in the above first aspect; or, any earphone ear-oriented debugging method in the above second aspect; or, any earphone ear-oriented debugging method in the above third aspect; or, any earphone ear-oriented debugging method in the above fourth aspect; or any earphone ear-oriented debugging method in the above fifth aspect; between the confirming the in-ear state signal indicating that the first earphone and the second earphone are in an in-ear state and the sending the first ear-oriented debugging waves to the second earphone based on the in-ear state signal, the method further includes: receiving an ear-oriented command signal sent from an external device; replacing the ear-oriented command signal to the in-ear state signal.

In an embodiment, the external device is a mobile terminal.

According to a seventh aspect, some embodiments of the present disclosure provide an earphone ear-oriented debugging apparatus, including: a state confirming module, configured to determine an in-ear state signal indicating that a first earphone and a second earphone are in an in-ear state; a first sending module, configured to send a plurality of first ear-oriented debugging waves to the second earphone according to the in-ear state signal, wherein the plurality of first ear-oriented debugging waves respectively correspond to a plurality of frequency points for wireless communication in a one-to-one correspondence; a first receiving module, configured to receive a first earphone configuration instruction sent from the second earphone, wherein the first earphone configuration instruction is generated by the second earphone according to the first ear-oriented debugging waves; and a first configuring module, configured to configure a configuration parameter of an antenna matching element of the first earphone according to the first earphone configuration instruction, to optimize a communication state.

In an embodiment, the first receiving module configured to receive a plurality second ear-oriented debugging waves sent from the second earphone, wherein the plurality of second ear-oriented debugging waves respectively correspond to a plurality of frequency points for wireless communication in a one-to-one correspondence, further includes: a first configuration generating module, configured to generate a second earphone configuration instruction based on the plurality of second ear-oriented debugging waves, wherein the second earphone configuration instruction is configured to configure a configuration parameter of an antenna matching element of the second earphone, to optimize a communication state; and a first sending module is configured to send the second earphone configuration instruction to the second earphone.

According to an eighth aspect, some embodiments of the present disclosure provide an earphone ear-oriented debugging apparatus, including: a second receiving module, configured to: after entering an in-ear state, receive a plurality of first ear-oriented debugging waves sent from the first earphone, wherein the plurality of first ear-oriented debugging waves respectively correspond to a plurality of frequency points for wireless communication in a one-to-one correspondence; a second configuration generating module, configured to generate a first earphone configuration instruction based on the plurality of first ear-oriented debugging waves, wherein the first earphone configuration instruction is configured to configure a configuration parameter of an antenna matching element of the first earphone, to optimize a communication state; and a second sending module configured to send the first earphone configuration instruction to the first earphone.

In an embodiment, the second sending module configured to send a plurality of second ear-oriented debugging waves to the first earphone, wherein the plurality of second ear-oriented debugging waves respectively correspond to a plurality of frequency points for wireless communication in a one-to-one correspondence; the second receiving module is further configured to receive a second earphone configuration instruction sent from the first earphone, wherein the second earphone configuration instruction is generated by the first earphone according to the second ear-oriented debugging waves; and a second configuring module, configured to configure a configuration parameter of an antenna matching element of the second earphone according to the second earphone configuration instruction, to optimize a communication state.

In an embodiment, the apparatus further includes: an initializing module configured to initialize configuration of an antenna matching element of the first earphone, to optimize the communication state.

According to a ninth aspect, some embodiments of the present disclosure provide an earphone ear-oriented debugging apparatus, including: any earphone ear-oriented debugging apparatus in the above seventh aspect; a command receiving module, configured to receive an ear-oriented command signal sent from the external device; a command replacing module, configured to replace the ear-oriented command signal to the in-ear state signal.

According to a tenth aspect, some embodiments of the present disclosure provide a wireless earphone including a controller configured to implement any of the above methods.

According to an eleventh first aspect, some embodiments of the present disclosure provide an earphone ear-oriented debugging system, including: a pair of first earphone and a second earphone, the first earphone and the second earphone are respectively the wireless earphone according to the tenth aspect. The first earphone and the second earphone are ear-oriented debugged.

In an embodiment, the apparatus further includes a mobile terminal configured to send the ear-oriented command signal to the first earphone and/or the second earphone.

BRIEF DESCRIPTION OF THE DRAWINGS

Embodiments according to the present disclosure will be described below with reference to the accompanying drawings. In the drawings.

DETAILED DESCRIPTION

Generally, an earphone ear-oriented debugging is performed for a traditional Bluetooth earphone before delivery. Specifically, an impedance matching debugging of a bare metal master earphone and slave earphone is performed, to allow the two Bluetooth earphones to achieve better communication quality. On this basis, in addition to performing the impedance matching debugging of the bare metal master earphone and slave earphone, an impedance matching debugging of a human body is further simulated, to make the environment closer to a human usage environment, and thus improved communication quality may be achieved as compared with the debugging of bare metal earphones. To be specific, as reflected in the user experience, during listening to music, a lag of music or an off-line of one earphone may be eliminated; or, during speech communication, a smooth speech communication may be ensured.

Inventors noted that: a problem is ignored in the above two debugging methods, that is, for both the bare metal debugging or simulated human body debugging, results of each of the two debugging methods are different for specific individuals. With respect to a specific individual wearing Bluetooth earphones, personal characteristics, e.g., a head size, a height, a shape and size of an ear contour, body fat content and other factors take into account. After a debugging is performed on a standard simulated human body, a result thereof may be not applicable to specific individuals, and a debugging effect may not be adapted to user experience of specific individuals.

To sum up, the earphone debugging in the related art has the following technical defects: the Bluetooth earphone products debugged before delivery are not adapted to actual use environment difference, which limits the optimization of communication quality and affects the user experience.

Figure 1:
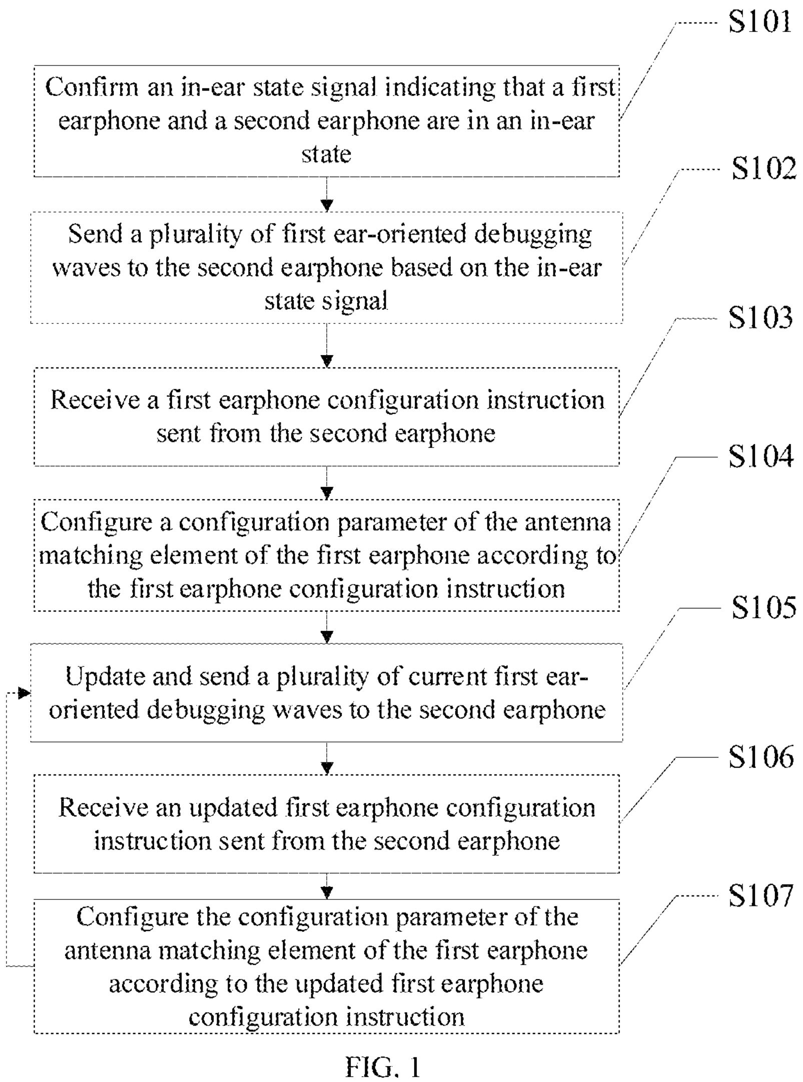
FIG. 1 is a flowchart of an earphone ear-oriented debugging method in an embodiment.

In order to reduce an ear-oriented debugging error that is caused by a usage environment difference and to optimize communication quality, an embodiment of the present disclosure provides an earphone ear-oriented debugging method. FIG. 1 is a flowchart of an earphone ear-oriented debugging method according to this embodiment, and the earphone ear-oriented debugging method includes following steps.

In step S101, an in-ear state signal indicating that a first earphone and a second earphone are in an in-ear state is confirmed. In this embodiment, the in-ear state refers to that the first earphone and the second earphone have been worn. In a specific embodiment, a sensor built in each earphone may be used to detect the in-ear state of the first earphone and the second earphone, afterwards, the in-ear state signal indicating that the first earphone and the second earphone are in the in-ear state may be confirmed.

In order to avoid false triggering of the in-ear state and to ensure that the first earphone and the second earphone are properly in the in-ear state, in a specific embodiment, during performing the step S101, the confirming the in-ear state signal that the first earphone and the second earphone are in the in-ear state includes: obtaining an in-ear triggering signal indicating the first earphone and the second earphone entering the in-ear state; judging whether the first earphone and the second earphone are maintained in the in-ear state in a preset duration; and confirming the in-ear state signal responsive to the first earphone and the second earphone being maintained in the in-ear state in a preset duration. Specifically, responsive to the first earphone and the second earphone entering the in-ear state, the in-ear triggering signal may be obtained through a sensor built in the earphone. The preset duration may be set to exclude a case that the first earphone and the second earphone are in a non-in-ear state, but has been determined to be in the in-ear state due to a mistakenly triggering and detection of the in-ear trigger signal. In a specific implementation process, the preset duration may be determined based on experience.

In step S102, a plurality of first ear-oriented debugging waves are sent to the second earphone based on the in-ear state signal. In this embodiment, the plurality of first ear-oriented debugging waves respectively correspond to a plurality of frequency points for wireless communication in a one-to-one correspondence. That is, each respective frequency point corresponds to a first ear-oriented debugging wave. In an example, the ear-oriented debugging wave may be a sine wave. It shall be noted that, in a specific implementation process, this embodiment is also applicable for other suitable ear-oriented debugging waves.

Figure 2:
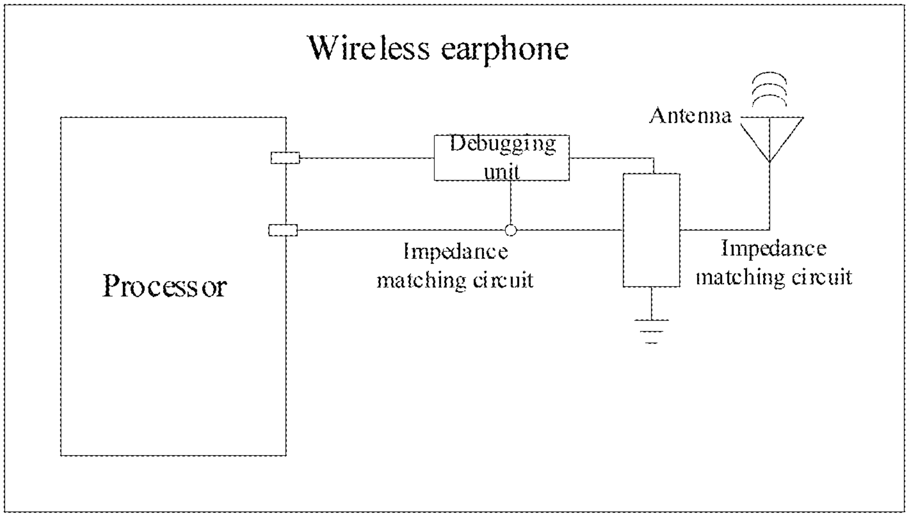
FIG. 2 is a schematic structural diagram of an antenna matching element of a wireless earphone involving configuration parameter of the antenna circuit in an embodiment of the present disclosure.

In step S103, a first earphone configuration instruction sent from the second earphone is received. In this embodiment, the so-called first earphone configuration instruction is generated by the second earphone according to the first ear-oriented debugging wave. Specifically, with reference to the below description, the first earphone configuration instruction is configured to instruct a configuration parameter of an antenna matching element of the first earphone, to optimize the communication quality of the first earphone and the second earphone. In a specific embodiment, referring to FIG. 2, which is a schematic structural diagram of an antenna matching element of a wireless earphone involving configuration parameter of the antenna circuit in this embodiment, the configuration parameter includes capacitance, inductance and/or resistance related to the antenna circuit of the wireless earphone. The communication quality of the antenna may be optimized by the configuration of the parameter.

In this embodiment, since the first earphone and the second earphone are both in the in-ear state, the first earphone matching instruction generated by the second earphone is obtained in accordance with an in-ear environment where the first earphone and the second earphone are currently located.

In step S104, a configuration parameter of the antenna matching element of the first earphone is configured according to the first earphone configuration instruction, to optimize a communication state. In a specific embodiment, after receiving the first earphone configuration instruction sent from the second earphone, the parameter of the antenna matching element of the first earphone may be configured based on the first earphone configuration instruction. For example, the capacitance, inductance and/or resistance of the antenna circuit may be configured. By configuring the antenna matching element, the communication quality of the antenna of the first earphone may be optimized, and the optimized communication quality is obtained for the in-ear environment where the first earphone and the second earphone are currently located. Specifically, when the second earphone is considered not currently working in an optimal frequency point state, it is required to decrease the operating frequency point interval (e.g., left shift the operating frequency point interval), and the first earphone configuration indication is generated accordingly. Then, the configuration parameter is configured for the antenna matching element of the first earphone according to the first earphone configuration instruction, to increase the operation frequency interval of the current Bluetooth communication. Otherwise, the frequency point interval may be increased (e.g., right shift the operating frequency point interval). A specific manner for generating the first earphone configuration instruction may be referred to the below description, which is not repeated herein.

Generally, there are 79 frequency points for the Bluetooth communication, e.g., the frequency points are in a range of 2402 to 2480. The configuration parameter of the antenna matching element for each frequency point is different. Thus, a frequency point corresponding to an optimized signal quality is determined for performing configuration and debugging accurately. Therefore, during performing the step S102, the plurality of first ear-oriented debugging waves sent to the second earphone based on the in-ear state signal may be first ear-oriented debugging waves corresponding to all frequency points.

In the earphone ear-oriented debugging method according to the embodiments of the present disclosure, after that the first earphone and the second earphone enter the in-ear state is confirmed, the plurality of first ear-oriented debugging waves are sent to the second earphone, and the plurality of first ear-oriented debugging waves respectively correspond to the plurality of frequency points for wireless communication in a one-to-one correspondence. And, the first earphone configuration instruction sent from the second earphone is received. Since the first earphone configuration instruction at this time is generated after the first earphone and the second earphone enter the in-ear state, the first earphone configuration instruction can be better adapted to the current actual usage environment. As a result, the configuration of the configuration parameter of the antenna matching element of the first earphone according to the first earphone configuration instruction can be better adapted to the current actual usage environment, thereby reducing an ear-oriented debugging error that is caused by a usage environment difference, and optimizing communication quality.

Figure 3:
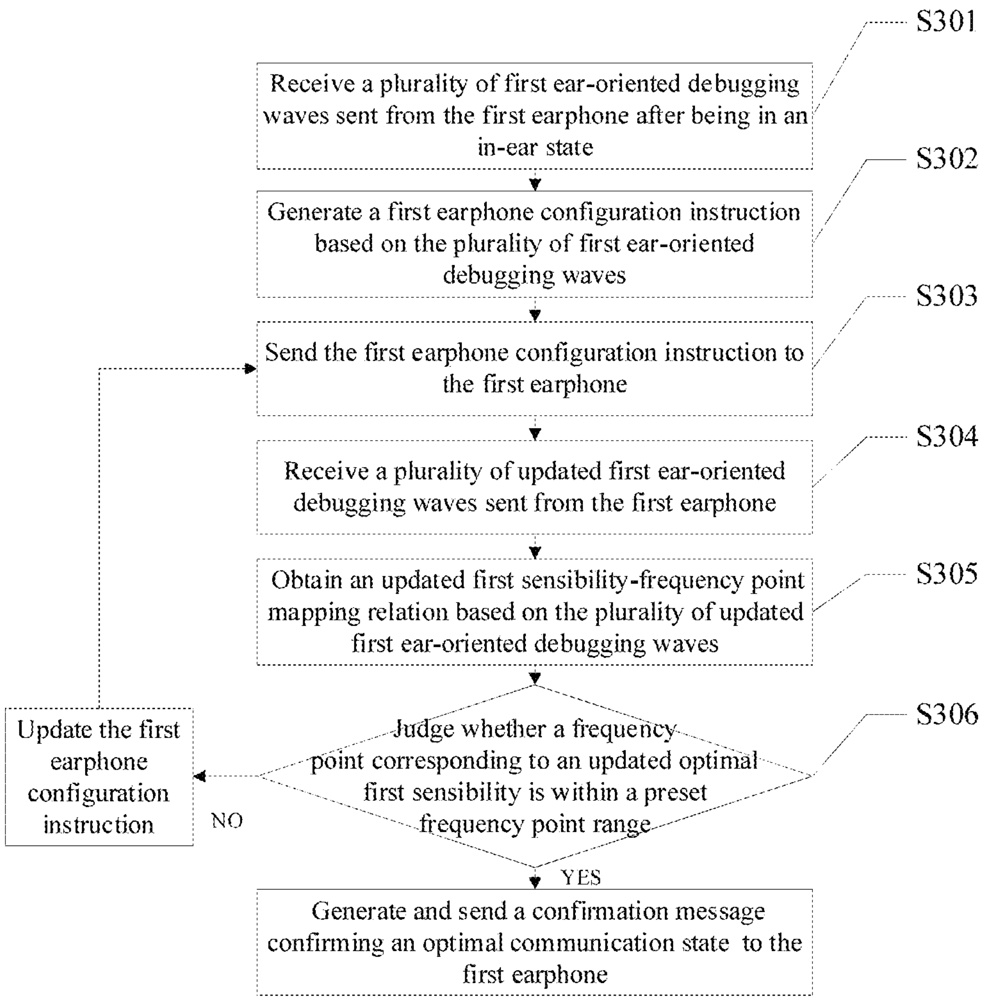
FIG. 3 is a flowchart of another earphone ear-oriented debugging method in an embodiment.

Referring to FIG. 3, which is a flowchart of another earphone ear-oriented debugging method in an embodiment, the earphone ear-oriented debugging method is applied to the second earphone, and the earphone ear-oriented debugging method includes following steps.

In step S301, a plurality of first ear-oriented debugging waves sent from the first earphone are received after entering an in-ear state. The plurality first ear-oriented debugging waves respectively correspond to a plurality of frequency points for wireless communication in a one-to-one correspondence. Specifically, reference may be made to the above embodiments.

In step S302, a first earphone configuration instruction is generated based on the plurality of first ear-oriented debugging waves. In this embodiment, the first earphone configuration instruction is configured to configure a configuration parameter of the antenna matching element of the first earphone, to optimize a communication state. In a specific embodiment, the first earphone configuration instruction may be generated based on a first sensibility-frequency point mapping relation. Specifically, during performing the step S302, the generating the first earphone configuration instruction based on the plurality of first ear-oriented debugging waves includes: obtaining the first sensibility-frequency point mapping relation based on the plurality of first ear-oriented debugging waves and a preset algorithm; judging whether a frequency point corresponding to an optimal first sensibility is within a preset frequency point range; generating the first earphone configuration instruction responsive to the frequency point corresponding to the optimal first sensibility being not within the preset frequency point range, to configure the configuration parameter of the antenna matching element of the first earphone, to cause the frequency point corresponding to the optimal first sensibility to shift in a direction close to the preset frequency point range. In a specific embodiment, the preset frequency point range may be determined based on experience. Generally, an optimal frequency point corresponding to the optimal first sensibility is 2.441 GHz. Certainly, in actual practice, the optimal frequency point may be around 2.441 GHz.

Figure 4:
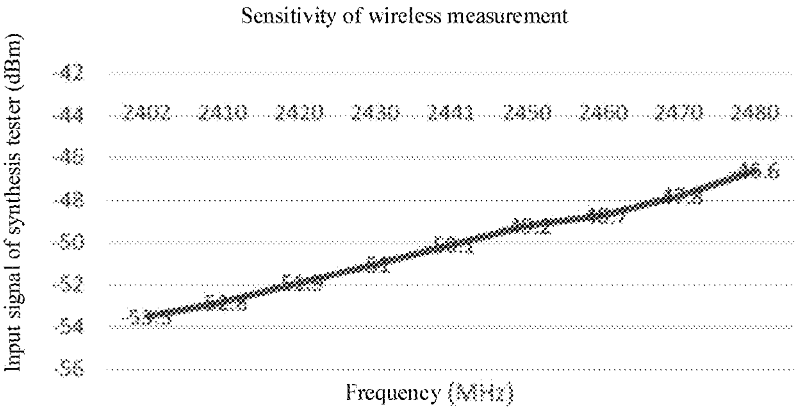
FIG. 4 is an exemplary schematic diagram of a first sensitivity-frequency point mapping relationship in an embodiment.
Figure 5:
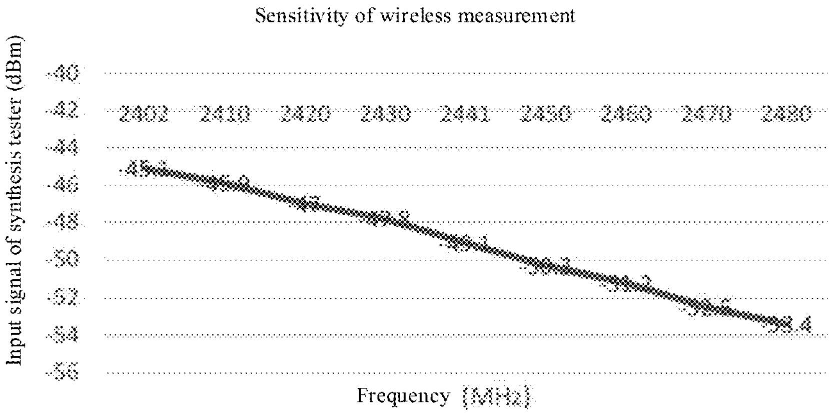
FIG. 5 is second exemplary schematic diagram of a first sensitivity-frequency point mapping relationship in an embodiment.
Figure 6:
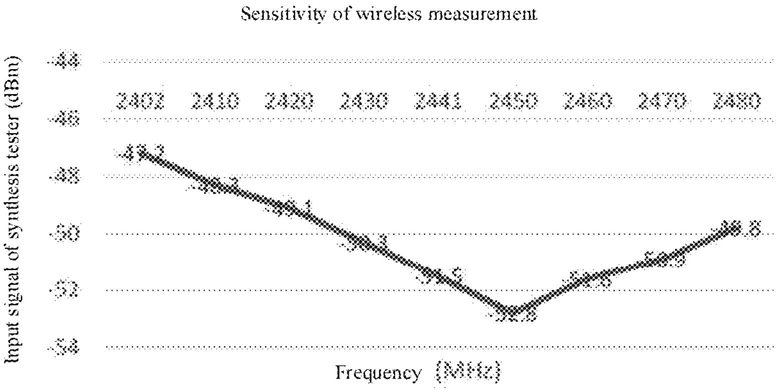
FIG. 6 is third exemplary schematic diagram of a first sensitivity-frequency point mapping relationship in an embodiment.

Reference may be made to FIGS. 4-6 to facilitate understanding for those skilled in the art.

Referring to FIG. 4, which is an exemplary schematic diagram of a first sensitivity-frequency point mapping relationship in an embodiment, after the plurality of first ear-oriented debugging waves are acquired, the first sensibility-frequency point mapping relation may be drawn by using a preset algorithm, as shown in FIG. 4. In FIG. 4, the sensitivity value increases as the frequency value of the frequency point increases, indicating that a corresponding resonant frequency value is less than 2.402 GHz, while a desired optimal frequency point is around 2.441 GHz. Therefore, the resonant frequency value needs to be right shifted, so that the resonant frequency value is shifted from less than 2.402 GHz to the frequency point of 2.441 GHz. That is, a right-shift first earphone configuration instruction is generated and sent to the first earphone. After receiving the instruction, the first earphone configures the configuration parameter of the antenna matching element according to the instruction, so that the resonant frequency may be shifted to the optimal frequency point.

Referring to FIG. 5, which is a second exemplary schematic diagram of a first sensitivity-frequency point mapping relation in an embodiment, after the plurality of first ear-oriented debugging waves are acquired, the first sensibility-frequency point mapping relation may be drawn by using a preset algorithm, as shown in FIG. 5. In FIG. 5, the sensitivity value decreases as the frequency value of the frequency point increases, indicating that a corresponding resonant frequency value is larger than 2.48 GHz, while a desired optimal frequency point is around 2.441 GHz. Therefore, the resonant frequency value needs to be left shifted, so that the resonant frequency value is shifted from larger than 2.48 GHz to the frequency point around 2.441 GHz. That is, a left-shift first earphone configuration instruction is generated and sent to the first earphone. After receiving the instruction, the first earphone configures the configuration parameter of the antenna matching element according to the instruction, so that the resonant frequency may be shifted to the optimal frequency point.

Referring to FIG. 6, which is a third exemplary schematic diagram of a first sensitivity-frequency point mapping relationship in an embodiment, after the plurality of first ear-oriented debugging waves are acquired, the first sensibility-frequency point mapping relation may be drawn by using a preset algorithm, as shown in FIG. 6. In FIG. 6, there exists a lowest sensibility value in the frequency interval, indicating that a resonant frequency value is within this frequency range. In this case, a relationship between the resonant frequency value and the optimal frequency point may be determined. If the resonant frequency value is less than 2.441 GHz, a right-shift first earphone configuration instruction is generated and sent to the first earphone. If the resonant frequency value is larger than 2.441 GHz, the left-shift first earphone configuration instruction is generated and sent to the first earphone.

It shall be noted that, in the above embodiments, the specific numerical values are not limited, but are only used as examples to facilitate better understanding for those skilled in the art.

In this embodiment, since the first earphone and the second earphone are both in the in-ear state, the first earphone configuration instruction generated by the second earphone is obtained for the in-ear environment where the first earphone and the second earphone are currently located.

In step S303, the first earphone configuration instruction is sent to the first earphone. The first earphone configuration instruction is sent to the first earphone after being generated in the step S302.

In the earphone ear-oriented debugging method in the embodiments of the present disclosure, after the earphones enter the in-ear state, the first earphone configuration instruction is generated and sent to the first earphone for configuring parameter based on the plurality of first ear-oriented debugging waves of the first earphone. Since the first earphone configuration instruction at this time is generated after the first earphone and the second earphone enter the in-ear state, the first earphone configuration instruction can be better adapted to the current actual usage environment. As a result, the configuration of the configuration parameter of the antenna matching element of the first earphone according to the first earphone configuration instruction can be better adapted to the current actual usage environment, thereby reducing an ear-oriented debugging error that is caused by a usage environment difference, and optimizing communication quality.

Since the first earphone and the second earphone may not know each other's current configuration parameter, the frequency point may not fall within the preset frequency range at one time when configuring the parameter according to the first earphone configuration instruction. Therefore, a plurality of instructions and configurations may be adopted in an iterative manner, to optimize the communication state.

Specifically, referring to FIG. 1, after performing the step S104, the method further includes following steps.

In step S105, a plurality of current first ear-oriented debugging waves are updated and sent to the second earphone. After completing the parameter configuration, the plurality of first ear-oriented debugging waves may be updated and sent to the second earphone again. It should be noted that, the plurality of updated first ear-oriented debugging waves also respectively correspond to frequency points.

In step S106, an updated first earphone configuration instruction sent from the second earphone is received. After the plurality of updated first ear-oriented debugging waves are sent to the second earphone, the second earphone may generate a new first earphone configuration instruction based on the plurality of updated first ear-oriented debugging waves and send the same to the first earphone.

In step S107, the configuration parameter of the antenna matching element of the first earphone is configured according to the updated first earphone configuration instruction. After receiving the new first earphone configuration instruction, a configuration parameter of the antenna matching element of the first earphone may be configured according to the new first earphone configuration instruction, to optimize a communication state.

In an alternative embodiment, after performing the step S107, the steps S105 to S107 may be performed again, to optimize the communication state.

In an alternative embodiment, after performing the step S106, the method may further include: receiving a confirmation message confirming an optimal communication state sent from the second earphone; and determining a current configuration parameter of the antenna matching element of the first earphone based on the confirmation message. After the second earphone confirms that the current communication state is an optimal state, the confirmation message is informed to the first earphone, and the first earphone determines a current configuration parameter based on the confirmation message. At this time, the first earphone may stop the updating and iterating operations of steps S105 to S107, and the ear-oriented debugging of the first earphone is completed.

In this embodiment, the communication state of the first earphone may be continuously iterated and optimized by updating the configuration of the configuration parameter of the antenna matching element by updating the plurality of first ear-oriented debugging waves.

Correspondingly, the second earphone may also update a configuration instruction based on the plurality of updated first ear-oriented debugging waves. Specifically, referring to FIG. 3, after performing the step S303, the method further includes following steps.

In step S304, a plurality of updated first ear-oriented debugging waves sent from the first earphone are received.

In step S305, an updated first sensibility-frequency point mapping relation is obtained based on the plurality of updated first ear-oriented debugging waves. A new first sensibility-frequency point mapping relation may be generated after the plurality of new first ear-oriented debugging waves are received. Specifically, the principle is similar to the above embodiments, and the detail is not repeated herein.

In step S306, whether a frequency point corresponding to an updated optimal first sensibility is within a preset frequency point range is judged. Specifically, reference may be made to the above embodiments, and the detail is not repeated herein.

In this embodiment, the first earphone configuration instruction is updated and sent to the first earphone responsive to the frequency point corresponding to the updated optimal first sensibility being not within the preset frequency point range, to configure a configuration parameter of the antenna matching element of the first earphone, to cause the frequency point corresponding to the optimal first sensibility to shift in a direction close to a preset frequency point range. Responsive to a frequency point corresponding to the updated optimal first sensibility being within the preset frequency point range, a confirmation message confirming an optimal communication state is generated and sent to the first earphone.

In this embodiment, the configuration instruction is updated after receiving the plurality of updated first ear-oriented debugging waves sent from the first earphone, and the configuration parameter of the antenna matching element of the first earphone is configured accordingly, so that the communication state of the first earphone may be continuously iterated and optimized.

Figure 7:
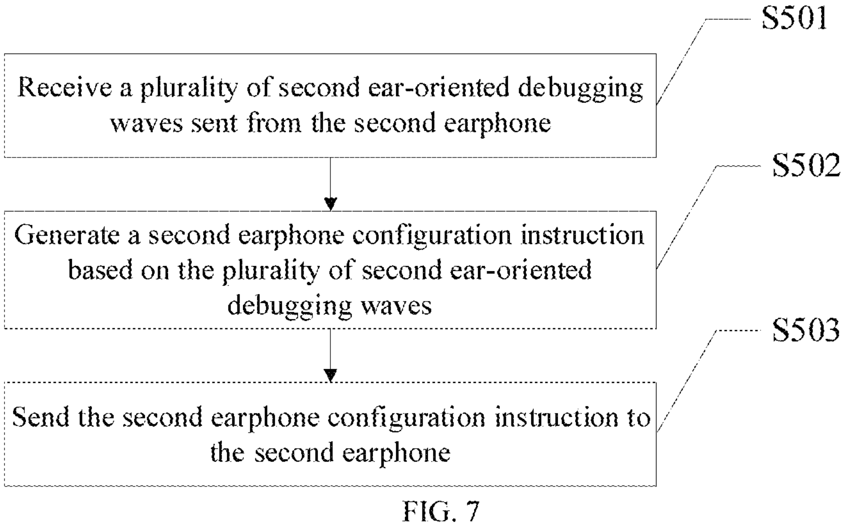
FIG. 7 is a third flowchart of an earphone ear-oriented debugging method in an embodiment.
Figure 8:
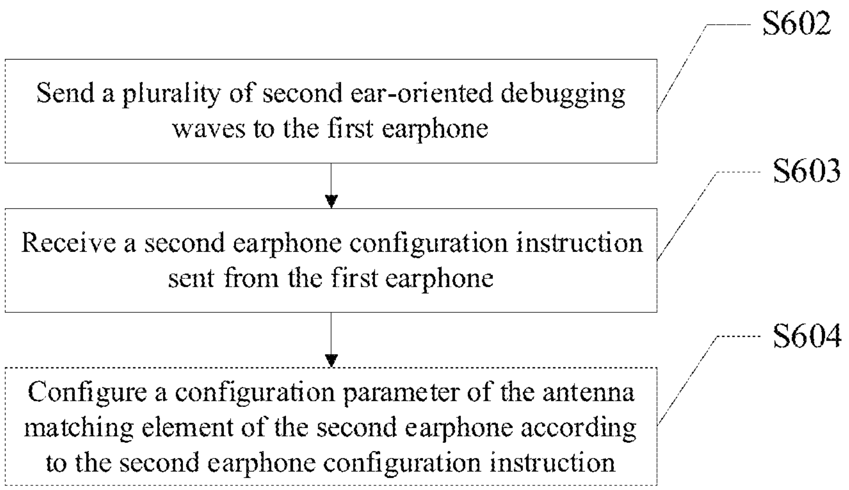
FIG. 8 is a fourth flowchart of an earphone ear-oriented debugging method in an embodiment.

After the configuration parameter of the first earphone is configured, a parameter configuration may be performed on the antenna matching element of the second earphone. Specifically, referring to FIG. 7, which is a flowchart of an earphone ear-oriented debugging method in an embodiment, the ear-oriented debugging method includes any method performed on the first earphone in the above embodiments. After the configuring the configuration parameter of the antenna matching element of the first earphone according to the first earphone configuration instruction, the method further includes following steps.

In step S501, a plurality of second ear-oriented debugging waves sent from the second earphone are received. In this embodiment, the plurality second ear-oriented debugging waves respectively correspond to the plurality of frequency points for wireless communication in a one-to-one correspondence. Specifically, the principle is similar to the step S301 in the above embodiments, and a difference lies in that the second ear-oriented debugging waves are from the second earphone, and the detail is not repeated herein.

In step S502, a second earphone configuration instruction is generated based on the plurality of second ear-oriented debugging waves. In this embodiment, the second earphone configuration instruction is configured to configure a configuration parameter of an antenna matching element of the second earphone, to optimize a communication state.

In a specific embodiment, during performing the step S502, the generating the second earphone configuration instruction based on the plurality of second ear-oriented debugging waves includes: obtaining a second sensibility-frequency point mapping relation based on the plurality of second ear-oriented debugging waves and a preset algorithm; judging whether a frequency point corresponding to an optimal second sensibility is within a preset frequency point range; generating the second earphone configuration instruction responsive to the frequency point corresponding to the optimal second sensibility being not within the preset frequency point range, to configure a configuration parameter of the antenna matching element of the second earphone, to cause the frequency point corresponding to the optimal second sensibility to shift in a direction close to a preset frequency point range.

Specifically, the principle of step S502 is similar to the step S302 in the above embodiments, and the detail is not repeated herein.

In step S503, the second earphone configuration instruction is sent to the second earphone. Specifically, the principle is similar to the step S303 in the above embodiments, and the detail is not repeated herein.

After performing the step S503, the method further includes: receiving a plurality of updated second ear-oriented debugging waves sent from the second earphone; obtaining an updated second sensibility-frequency point mapping relation based on the plurality of updated second ear-oriented debugging waves; judging whether a frequency point corresponding to an updated optimal second sensibility is within a preset frequency point range; responsive to the frequency point corresponding to the updated optimal second sensibility being not within the preset frequency point range, updating the second earphone configuration instruction, to configure a configuration parameter of the antenna matching element of the second earphone, to cause the frequency point corresponding to the optimal second sensibility to shift in a direction close to the preset frequency point range; and responsive to the updated optimal second sensibility being within the preset frequency point range, sending a confirmation message confirming an optimal state to the second earphone.

Specifically, the principle of the above steps is similar to the steps S304 to S306 in the above embodiments, and a difference lies in that the second ear-oriented debugging wave is for the second earphone, and the second earphone configuration instruction is generated by the first earphone for configuring a configuration parameter of the second earphone. The detail is not repeated herein.

After completion of the configuration of the first earphone is confirmed, a parameter configuration may be performed on the antenna matching element of the second earphone. Specifically, referring to FIG. 68, which is a flowchart of an earphone ear-oriented debugging method in an embodiment, the ear-oriented debugging method includes any method performed on the second earphone in the above embodiments. After confirming the configuration of the first earphone is completed, the method further includes following steps.

In step S602, a plurality of second ear-oriented debugging waves are sent to the first earphone. The plurality of second ear-oriented debugging waves respectively correspond to a plurality of frequency points for wireless communication in a one-to-one correspondence. Specifically, the principle is similar to the step S102, a difference lies in that the second ear-oriented debugging waves are for the second earphone, and the detail is not repeated herein.

In step S603, a second earphone configuration instruction sent from the first earphone is received. Specifically, the principle is similar to the step S103, a difference lies in that the second earphone configuration instruction is generated by the first earphone and is configured to configure a configuration parameter of the second earphone. The detail is not repeated herein.

In step S604, a configuration parameter of the antenna matching element of the second earphone is configured according to the second earphone configuration instruction, to optimize a communication state. The principle is similar to the step S104, and a difference lies in that the second earphone configures the configuration parameter of the second earphone according to the second earphone configuration instruction and the detail is not repeated herein.

In an alternative embodiment, after configuring the configuration parameter of the antenna matching element of the second earphone according to the second earphone configuration instruction, the method further includes: updating and sending a plurality of current second ear-oriented debugging waves to the first earphone; receiving an updated second earphone configuration instruction sent from the first earphone; and configuring a configuration parameter of the antenna matching element of the second earphone according to the updated second earphone configuration instruction, to optimize a communication state.

In an alternative embodiment, after configuring the configuration parameter of the antenna matching element of the second earphone according to the updated second earphone configuration instruction, the method further includes: receiving a confirmation message confirming an optimal communication state from the first earphone; and determining a current configuration parameter of the antenna matching element of the second earphone based on the confirmation message.

Specifically, the principle of the above steps is similar to the steps S015 to S107 in the above embodiments, and a difference lies in that the second ear-oriented debugging waves are for the second earphone, the second earphone configuration instruction is generated by the first earphone and is configured to configure a configuration parameter of the second earphone. The detail is not repeated herein.

Some embodiments further provide an earphone ear-oriented debugging method, a difference from the above embodiments lies in that, before performing the steps S101 and S301, this method further includes: initializing configuration of the antenna matching element of the first earphone, to optimize a communication state.

Figure 9:
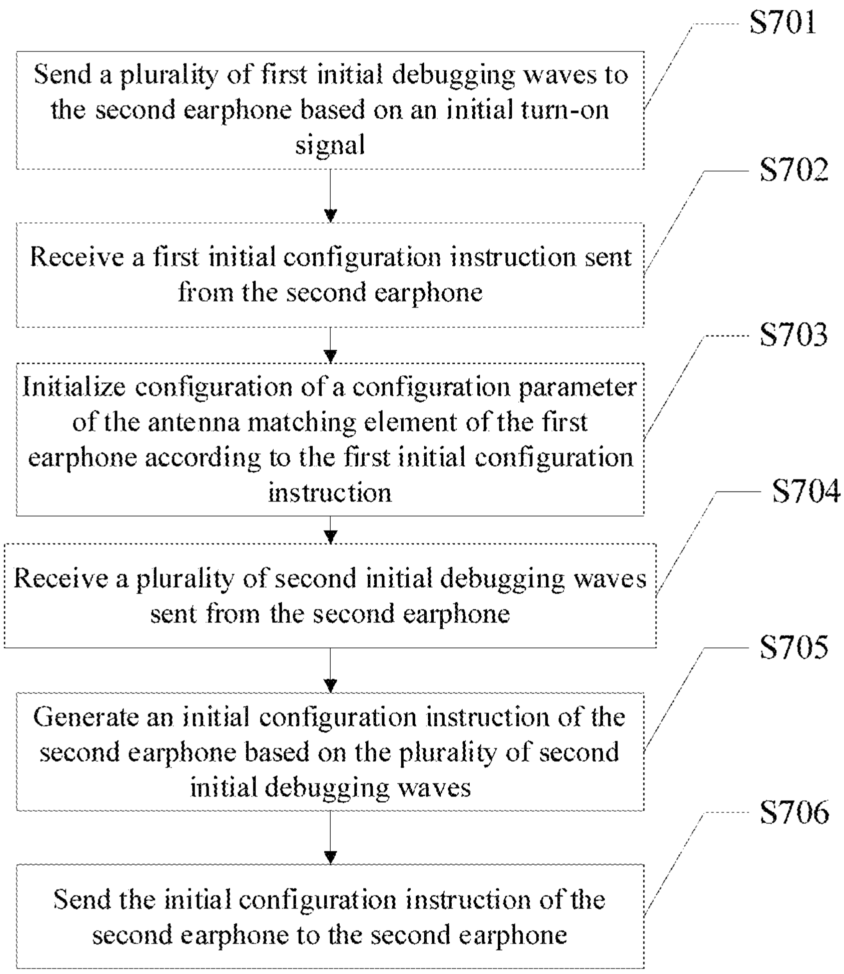
FIG. 9 is a flowchart of a method for initializing configuration of an antenna matching element of a first earphone in an embodiment.

Specifically, referring to FIG. 9, which is a flowchart of a method for initializing configuration of the antenna matching element of the first earphone in an embodiment, the method for initializing configuration includes following steps.

In step S701, a plurality of first initial debugging waves are sent to the second earphone based on an initial turn-on signal. In this embodiment, the initial turn-on refers to a first booting power after a user gets the first earphone and the second earphone, and before that, the first earphone and the second earphone were never in ear under a turn-on status. In a specific embodiment, when the first earphone and the second earphone are turned on, an initial turn-on signal may be detected by a built-in detection unit of the first earphone and the second earphone. The first initial debugging wave refers to a debugging wave when the first earphone and the second earphone are turned on for the first time and not in the ears. The debugging wave may be the same to the first ear-oriented debugging wave, or may be set separately.

In step S702, a first initial configuration instruction sent from the second earphone is received. The principle of the step is similar to the step S103, the detail may be referred to the description in the step S103 and is not repeated herein.

In step S703, configuration of a configuration parameter of the antenna matching element of the first earphone is initialized according to the first initial configuration instruction, to optimize a communication state. The principle of the step is similar to the step S104, the detail may be referred to the description in the step S104 and is not repeated herein.

In an alternative embodiment, after performing the step S703 of configuring the configuration parameter of the antenna matching element of the first initial according to the first initial earphone configuration instruction, the method further includes following steps.

In step S704, a plurality of second initial debugging waves sent from the second earphone are received. The second initial debugging wave refers to a debugging wave when the first earphone and the second earphone are turned on for the first time and not in the ears. The debugging wave may be the same to the second ear-oriented debugging wave, or may be set separately.

In step S705, an initial configuration instruction of the second earphone is generated based on the plurality of second initial debugging waves. The principle of the step is similar to the step S502, the detail may be referred to the description in the step S502 and is not repeated herein.

In step S706, the initial configuration instruction of the second earphone is sent to the second earphone, to initialize configuration of the antenna matching element of the second earphone, to optimize the communication state. The principle of the step is similar to the step S503, the detail may be referred to the description in the step S503 and is not repeated herein.

In this embodiment, by initializing configuration of the antenna matching elements of the first earphone and the second earphone before the first earphone and the second earphone are inserted into the ear, the communication state may be preliminarily optimized before the first earphone and the second earphone are in the earphone state. Afterwards, the debugging configuration may be only performed for the in-ear environment, thereby improving the in-ear debugging efficiency.

It shall be noted that, in a specific implementation process, the initializing configuration of the antenna matching elements of the first earphone and the second earphone may be performed only when the first earphone and the second earphone are turned on for the first time, and the initializing configuration is not required for subsequent turn-on operations.

Some embodiments further provide an earphone ear-oriented debugging method, a difference from the above embodiments lies in that, between the confirming the in-ear state signal indicating that the first earphone and the second earphone are in an in-ear state and the sending the first ear-oriented debugging waves to the second earphone based on the in-ear state signal, the method further includes: receiving an ear-oriented command signal sent from an external device; replacing the ear-oriented command signal to the in-ear state signal. In a specific embodiment, the external device may be a mobile terminal, e.g., a mobile phone, a tablet, etc. After replacing the ear-oriented command signal to the in-ear state signal, steps in the above embodiments may be sequentially performed to complete the optimal configuration of the first earphone and the second earphone in the in-ear state according to the ear-oriented command signal.

In this embodiment, the optimized configuration of the first earphone and the second earphone is completed according to the ear-oriented command signal, so that the configuration of the first earphone and the second earphone is updated and optimized after the in-ear environment of the first earphone and the second earphone changes, so as to optimize the communication quality for a new in-ear environment.

To facilitate understanding of those skilled in the art, an application scenario is listed as below.

First, the first earphone and the second earphone are turned on by a user A for the first time, and the first earphone and the second earphone may be initially configured. After the user A wears the first earphone and the second earphone, the first earphone and the second earphone may be ear-oriented debugged in the in-ear state respectively. After the debugging, the first earphone and the second earphone are adapted to the user A with optimized communication quality.

Second, when a user B wears the above first earphone and second earphone, since in-ear environments used for user A and user B are different, such as a head size, a height (affecting a distance between a mobile phone and the earphones), a contour of an ear, and a wearing depth of the earphones, the communication quality debugged for the first earphone and the second earphone worn by the user A may be not optimized in this case. Therefore, a new ear-oriented debugging in the in-ear state may be performed by the ear-oriented command signal.

Figure 10:
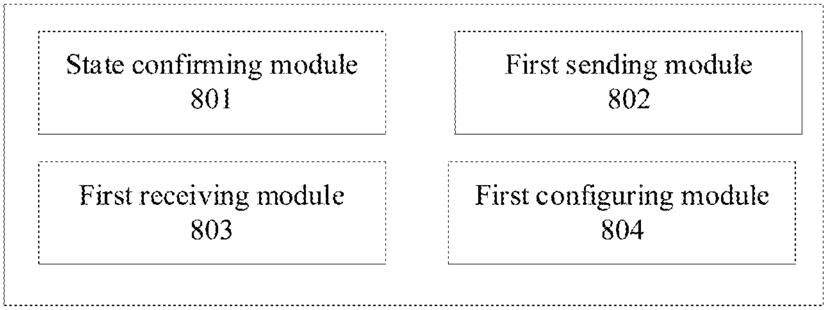
FIG. 10 is a schematic structural diagram of an earphone ear-oriented debugging apparatus in an embodiment.

Some embodiments further provide an earphone ear-oriented debugging apparatus, referring to FIG. 10, which is a schematic diagram of an earphone ear-oriented debugging apparatus in an embodiment, the earphone ear-oriented debugging apparatus includes: a state confirming module 801, a first sending module 802, a first receiving module 803 and a first configuring module 804.

The state confirming module 801 is configured to confirm an in-ear state signal indicating that a first earphone and a second earphone are in an in-ear state. The first sending module 802 is configured to send a plurality of first ear-oriented debugging waves to the second earphone according to the in-ear state signal, wherein the plurality of first ear-oriented debugging waves respectively correspond to a plurality of frequency points for wireless communication in a one-to-one correspondence. The first receiving module 803 is configured to receive a first earphone configuration instruction sent from the second earphone. The first configuring module 804 is configured to configure a configuration parameter of an antenna matching element of the first earphone according to the first earphone configuration instruction, to optimize a communication state.

In an alternative embodiment, the first receiving module 803 is further configured to receive a plurality second ear-oriented debugging waves sent from the second earphone, wherein the plurality of second ear-oriented debugging waves respectively correspond to a plurality of frequency points for wireless communication in a one-to-one correspondence. The earphone ear-oriented debugging apparatus further includes: a first configuration generating module configured to generate a second earphone configuration instruction based on the plurality of second ear-oriented debugging waves. The second earphone configuration instruction is configured to configure a configuration parameter of the antenna matching element of the second earphone to optimize a communication state. The first sending module 802 is configured to send the second earphone configuration instruction to the second earphone.

Figure 11:
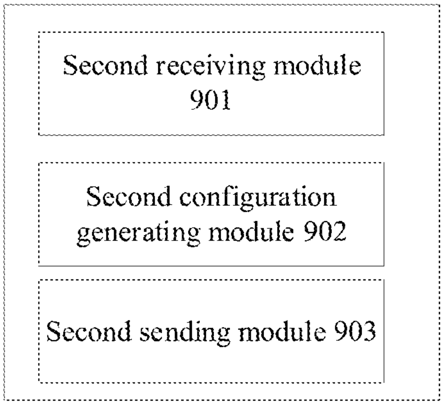
FIG. 11 is a schematic structural diagram of another earphone ear-oriented debugging apparatus in an embodiment.

Some embodiments further provide an earphone ear-oriented debugging apparatus, referring to FIG. 11, which is a schematic diagram of an earphone ear-oriented debugging apparatus in an embodiment, the ear-oriented debugging apparatus includes a second receiving module 901, a second configuration generating module 902 and a second sending module 903.

The second receiving module 901 is configured to: after entering an in-ear state, receive a plurality of first ear-oriented debugging waves sent from the first earphone, wherein the plurality of first ear-oriented debugging waves respectively correspond to a plurality of frequency points for wireless communication in a one-to-one correspondence. The second configuration generating module 902 is configured to generate a first earphone configuration instruction based on the plurality of first ear-oriented debugging waves, wherein the first earphone configuration instruction is configured to configure a configuration parameter of an antenna matching element of the first earphone, to optimize a communication state. The second sending module 903 is configured to send the first earphone configuration instruction to the first earphone.

In an alternative embodiment, the second sending module is further configured to send a plurality of second ear-oriented debugging waves to the first earphone, wherein the plurality of second ear-oriented debugging waves respectively correspond to a plurality of frequency points for wireless communication in a one-to-one correspondence. The second receiving module is further configured to receive a second earphone configuration instruction sent from the first earphone. The ear-oriented debugging apparatus further includes a second configuring module configured to configure a configuration parameter of an antenna matching element of the second earphone according to the second earphone configuration instruction, to optimize a communication state.

In an alternative embodiment, the apparatus further includes an initializing module configured to initialize configuration of the antenna matching element of the first earphone, to optimize the communication state.

In an alternative embodiment, the apparatus further includes a command receiving module and a command replacing module. The command receiving module is configured to receive an ear-oriented command signal sent from the external device. The command replacing module is configured to replace the ear-oriented command signal to the in-ear state signal.

Some embodiments further provide a wireless earphone including a controller configured to implement any method in the above embodiments.

Figure 12:
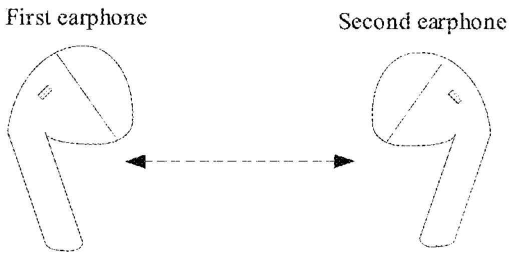
FIG. 12 is a schematic diagram of a pair of first earphone and second earphone in an embodiment.

Some embodiments further provide an earphone ear-oriented debugging system, including a pair of first earphone and second earphone. Referring to FIG. 12, which is a schematic diagram of a pair of first earphone and second earphone in an embodiment, in a specific embodiment, each of the first earphone and the second earphone is the wireless earphone according to any of the above embodiments. The first earphone and the second earphone are ear-oriented debugged. In a specific embodiment, the first earphone and the second earphone are respectively a left earphone and a right earphone, or a right earphone and a left earphone.

In an alternative embodiment, the earphone ear-oriented debugging system further includes a mobile terminal, which is configured to send the ear-oriented command signal to the first earphone and/or the second earphone. In a specific embodiment, the mobile terminal may be a terminal device, such as a mobile phone, a tablet, etc., that may perform data interaction with the earphone.

Those skilled in the art may understand that, under the premise of no conflict, the above preferred solutions may be freely combined and superimposed.

It shall be understood that the above-mentioned embodiments are only exemplary rather than restrictive, and those skilled in the art may make obvious or equivalent to the above-mentioned details without departing from the basic principles of the present disclosure. Modifications or substitutions may be included within the scope of the claims of the present disclosure.

What is claimed is:

1. An earphone ear-oriented debugging method, comprising:

confirming an in-ear state signal indicating that a first earphone and a second earphone are in an in-ear state;

sending a plurality of first ear-oriented debugging waves to the second earphone according to the in-ear state signal, the plurality of first ear-oriented debugging waves respectively corresponding to a plurality of frequency points for wireless communication in a one-to-one correspondence;

receiving a first earphone configuration instruction sent from the second earphone, the first earphone configuration instruction being generated by the second earphone according to the first ear-oriented debugging waves; and configuring a configuration parameter of an antenna matching element of the first earphone according to the first earphone configuration instruction, to optimize a communication state.

2. The earphone ear-oriented debugging method according to claim 1, wherein the confirming the in-ear state signal indicating that the first earphone and the second earphone are in the in-ear state comprises:

obtaining an in-ear triggering signal indicating the first earphone and the second earphone entering the in-ear state;

judging whether the first earphone and the second earphone are maintained in the in-ear state in a preset duration; and confirming the in-ear state signal responsive to the first earphone and the second earphone being maintained in the in-ear state in the preset duration.

3. The earphone ear-oriented debugging method according to claim 1, wherein after the configuring the configuration parameter of the antenna matching element of the first earphone according to the first earphone configuration instruction, the method further comprises:

updating and sending the plurality of first ear-oriented debugging waves to the second earphone;

receiving an updated first earphone configuration instruction sent from the second earphone; and configuring a configuration parameter of the antenna matching element of the first earphone according to the updated first earphone configuration instruction, to optimize the communication state.

4. The earphone ear-oriented debugging method according to claim 3, wherein after configuring the configuration parameter of the antenna matching element of the first earphone according to the updated first earphone configuration instruction, the method further comprises:

receiving a confirmation message confirming an optimal communication state from the second earphone; and determining a current configuration parameter of the antenna matching element of the first earphone based on the confirmation message.

5. The earphone ear-oriented debugging method according to claim 1, wherein after the configuring the configuration parameter of the antenna matching element of the first earphone according to the first earphone configuration instruction, the method further comprises:

receiving a plurality second ear-oriented debugging waves sent from the second earphone, the plurality of second ear-oriented debugging waves respectively corresponding to a plurality of frequency points for wireless communication in a one-to-one correspondence;

generating a second earphone configuration instruction based on the plurality of second ear-oriented debugging waves, the second earphone configuration instruction being configured to configure a configuration parameter of an antenna matching element of the second earphone, to optimize a communication state; and sending the second earphone configuration instruction to the second earphone.

6. The earphone ear-oriented debugging method according to claim 5, wherein the generating the second earphone configuration instruction based on the plurality of second ear-oriented debugging waves comprises:

obtaining a second sensibility-frequency point mapping relation based on the plurality of second ear-oriented debugging waves and a preset algorithm;

judging whether a frequency point corresponding to an optimal second sensibility is within a preset frequency point range; and responsive to the frequency point corresponding to the optimal second sensibility being not within the preset frequency point range, generating the second earphone configuration instruction to configure a configuration parameter of the antenna matching element of the second earphone, to cause the frequency point corresponding to the optimal second sensibility to shift in a direction close to the preset frequency point range.

7. The earphone ear-oriented debugging method according to claim 6, wherein after the sending the second earphone configuration instruction to the second earphone, the method further comprises:

receiving a plurality of updated second ear-oriented debugging waves sent from the second earphone;

obtaining an updated second sensibility-frequency point mapping relation based on the plurality of updated second ear-oriented debugging waves;

judging whether a frequency point corresponding to the updated optimal second sensibility is within a preset frequency point range; and responsive to the frequency point corresponding to the updated optimal second sensibility being not within the preset frequency point range, updating the second earphone configuration instruction to configure the configuration parameter of the antenna matching element of the second earphone, to cause the frequency point corresponding to the optimal second sensibility to shift in a direction close to the preset frequency point range.

8. The earphone ear-oriented debugging method according to claim 7, further comprises: responsive to the updated optimal second sensibility being within the preset frequency point range, sending a confirmation message confirming an optimal state to the second earphone.

9. The earphone ear-oriented debugging method according to claim 1, wherein before sending the plurality of first ear-oriented debugging waves to the second earphone based on the in-ear state signal, the method further comprises: initializing configuration of the antenna matching element of the first earphone to optimize the communication state.

10. The earphone ear-oriented debugging method according to claim 9, wherein the initializing configuration of the antenna matching element of the first earphone comprises:

sending a plurality of first initial debugging waves to the second earphone based on an initial turn-on signal;

receiving a first initial configuration instruction sent from the second earphone, the first initial configuration instruction being generated by the second earphone according to the first initial debugging wave; and initializing configuration of a configuration parameter of the antenna matching element of the first earphone according to the first initial configuration instruction, to optimize a communication state.

11. The earphone ear-oriented debugging method according to claim 10, wherein after the initializing configuration of the antenna matching element of the first earphone according to the first initial configuration instruction, the method further comprises:

receiving a plurality of second initial debugging waves sent from the second earphone;

generating an initial configuration instruction of the second earphone based on the plurality of second initial debugging waves; and sending the initial configuration instruction of the second earphone to the second earphone, to initialize configuration of an antenna matching element of the second earphone, to optimize the communication state.

12. The earphone ear-oriented debugging method according to claim 1, wherein between the confirming the in-ear state signal indicating that the first earphone and the second earphone are in an in-ear state and the sending the first ear-oriented debugging waves to the second earphone based on the in-ear state signal, the method further comprises:

receiving an ear-oriented command signal sent from an external device; and replacing the ear-oriented command signal with the in-ear state signal.

13. The earphone ear-oriented debugging method according to claim 12, wherein the external device is a mobile terminal.

14. An earphone ear-oriented debugging method, comprising:

receiving a plurality of first ear-oriented debugging waves sent from a first earphone after entering an in-ear state, the plurality of first ear-oriented debugging waves respectively corresponding to a plurality of frequency points for wireless communication in a one-to-one correspondence;

generating a first earphone configuration instruction based on the plurality of first ear-oriented debugging waves, the first earphone configuration instruction being configured to configure a configuration parameter of an antenna matching element of the first earphone to optimize a communication state; and sending the first earphone configuration instruction to the first earphone.

15. The earphone ear-oriented debugging method according to claim 14, wherein the generating the first earphone configuration instruction based on the plurality of first ear-oriented debugging waves comprises:

obtaining a first sensibility-frequency point mapping relation based on the plurality of first ear-oriented debugging waves and a preset algorithm;

judging whether a frequency point corresponding to an optimal first sensibility is within a preset frequency point range; and generating the first earphone configuration instruction responsive to the frequency point corresponding to the optimal first sensibility being not within the preset frequency point range, to configure the configuration parameter of the antenna matching element of the first earphone, to cause the frequency point corresponding to the optimal first sensibility to shift in a direction close to the preset frequency point range.

16. The earphone ear-oriented debugging method according to claim 15, wherein after the sending the first earphone configuration instruction to the first earphone, the method further comprises:

receiving a plurality of updated first ear-oriented debugging waves sent from the first earphone;

obtaining an updated first sensibility-frequency point mapping relation based on the plurality of updated first ear-oriented debugging waves;

judging whether a frequency point corresponding to an updated optimal first sensibility is within the preset frequency point range; and updating and sending the first earphone configuration instruction to the first earphone responsive to a frequency point corresponding to the updated optimal first sensibility being not within the preset frequency point range, to configure a configuration parameter of the antenna matching element of the first earphone, to cause the frequency point corresponding to the optimal first sensibility to shift in a direction close to the preset frequency point range.

17. The earphone ear-oriented debugging method according to claim 16, wherein responsive to the updated optimal first sensibility being within the preset frequency point range, sending a confirmation message for confirming an optimal state to the first earphone.

18. The earphone ear-oriented debugging method according to claim 14, wherein after confirming the first earphone configuration is completed, the method further comprises:

sending a plurality second ear-oriented debugging waves to the first earphone, the plurality second ear-oriented debugging waves respectively corresponding to a plurality of frequency points for wireless communication in a one-to-one correspondence;

receiving a second earphone configuration instruction sent from the first earphone, the second earphone configuration instruction being generated by the first earphone based on the second ear-oriented debugging waves; and configuring a configuration parameter of the antenna matching element of the second earphone according to the second earphone configuration instruction, to optimize a communication state.

19. The earphone ear-oriented debugging method according to claim 18, wherein, after the configuring the configuration parameter of the antenna matching element of the second earphone according to the second earphone configuration instruction, the method further comprises:

updating and sending a plurality of current second ear-oriented debugging waves to the first earphone;

receiving an updated second earphone configuration instruction sent from the first earphone; and configuring a configuration parameter of the antenna matching element of the second earphone according to the updated second earphone configuration instruction, to optimize the communication state.

20. The earphone ear-oriented debugging method according to claim 19, wherein after configuring the configuration parameter of the antenna matching element of the second earphone according to the updated second earphone configuration instruction, the method further comprises:

receiving a confirmation message confirming an optimal communication state from the first earphone; and determining a current configuration parameter of the antenna matching element of the second earphone based on the confirmation message.

* * * * *